United States Patent Office 3,290,149

Patented Dec. 6, 1966

3,290,149

PROCESS FOR INCREASING OPTICAL DENSITIES

Edward Terry Cline, Wilmington, Del., assignor to E. I. du Pont de Nemours and Company, Wilmington, Del., a corporation of Delaware No Drawing. Filed Mar. 1, 1962, Ser. No. 176,814
9 Claims. (Cl. 96—27)

This invention relates to a new and improved process for increasing the optical density of thin, opaque coatings of pressure-clearable, porous polymers on a flexible substrate.

Opaque films of hydrophobic vinyl-type polymers which have open-cell voids and which are clearable to substantial transparency upon application of pressure have been described in U.S. 2,957,791. Films of this general type have many uses. One that has considerable technical importance is that described in Bechtold U.S. application S.N. 63,953, filed October 21, 1960, now U.S. Pat. No. 3,149,967. This involves the use of a selectively cleared opaque film in the printing industry. For this utility, as well as other potential applications in storing and reproducing information, thin films of high dimensional stability are of great importance. A means of obtaining such a product has been to deposit an adherent thin, porous, opaque layer of pressure-clearable polymeric material upon a base film that combines strength, flexibility, dimensional stability (particularly at elevated temperatures), transparency, and inertness to a high degree, such as of the oriented polyester type. When a relief or printing form, e.g., type face, or half-tone engraving, is contacted with the opaque layer, portions that are subjected to pressure become clear. The resulting image-bearing film contains substantially transparent portions along with the white opaque portions that were not subjected to pressure.

Images thus obtained are of considerable utility for the preparation of printing elements from photosensitive plates by directing light through the image-bearing film directly onto an unexposed or raw photosensitive plate material. Photosensitive plates include photopolymerizable plates as described in U.S. Patents 2,791,504, 2,927,022 and 2,927,023, as well as various presensitized lithographic plates or bimetallic plates.

Although the above-described selectively cleared opaque, porous polymer films have been used directly for making printing elements, including intermediate contact photographic positives or negatives, the opaque portions must be treated with care to avoid accidental damage by scratching, rubbing, or striking. Furthermore, since thin opaque coatings are preferred to obtain faithful reproduction and avoid the use of high pressures, the optical density of the opaque background portions often is not sufficient to prevent transmission of very high intensity light. Thin coatings can be readily cleared by pressure but without further treatment are not always satisfactory optically for direct preparation of high quality printing plates.

To avoid these difficulties, it has been proposed that the optical density and permanence of opaque areas can be improved by the deposition of a dye or an opaque material in the open-celled pores. One method involves deposition of an opaque material, e.g., by precipitation of lead sulfide in situ by treatment first with soluble lead salts and then with a sulfide. A more rapid method has been by the treatment of unclarified porous portions with an aqueous solution of an after-chromed dye. Although these techniques result in increased optical density, there are certain disadvantages to the products heretofore obtained. In the first place, washing to remove salt or dye from the cleared portions also removes some dye from the open-celled pores in the opaque portion. Wiping to remove dye or deposits from the surface causes streaks to occur. When streaked image-bearing films are used to prepare printing plates by photographic processes, the final plates will contain corresponding imperfections.

An object of this invention is to provide a new process for improving the optical density properties of selectively cleared opaque porous polymer films. Another object is to provide such a process that is simple, economical and provides opaque areas of improved density. A further object is to provide such a process that uses commercially available treating agents. Still further objects will be apparent from the following description.

The process of the present invention comprises:

(a) treating the surface of an opaque layer of an organic polymer having clear, dense image areas and porous opaque areas with an aqueous solution containing (1) a dye, more particularly a water-soluble dye, (2) a surface-active agent having wetting and deterging properties, and (3) a water-miscible organic solvent, preferably an alkanol of 1–4 carbon atoms, (b) physically (mechanically) removing excess dye from the surface of the layer and (c) removing additional dye from the surface of the layer by treating said surface with an aqueous solution containing a dye insolubilizing agent, preferably a water-soluble polyvalent inorganic metal salt.

The solution of step (c) can be physically removed in the same manner as in step (b) and, if desired, the surface of the treated layer can be washed with water and dried.

In physically removing the aqueous treatment solutions of steps (b) and (c), the excess dye etc., can be removed from the surface by gently passing a sponge, a rubber squeegee, cotton batting, tissue paper or soft woven cloth or felt over the surface. These materials should have a soft yielding surface so that they do not scratch or abrade the polymer surface. After treatment with the aqueous solution of the inorganic salt, a gentle swabbing action with a dripping wet sponge, cotton batting or paper tissue gives good results. A final rinsing with water has the advantage that optical density of the porous areas containing the dye is of uniform quality and is free from streaks and scratches or abrasion markings. Likewise, the clear areas are free from streaks and dye.

The opaque, porous films useful for the preparation of image-bearing films are those that can be selectively cleared by pressure, heat or solvents. The films are characterized by opacity, open-celled porosity, low-bulk density, and ease of clearing into areas having high light transmission, i.e., low opacity with loss of porosity. Preferred opaque films are described in U.S. 2,957,791 and in assignee's Bechtold application Ser. No. 63,953, filed Oct. 21, 1960. These films are composed of hydrophobic polymers, generally of the vinyl type addition polymers, including copolymers that soften or are thermally moldable above about 50° C., and usually not over 125° C. The porosity is substantially uniform with a pore diameter generally less than a micron and with a major part less than ½ micron. The opaque film becomes transparent when pressures of 10,000 lb. sq. in. are applied.

The opaque layers useful in this invention have a thickness of between 0.1 to 5 mils and usually less than 1.5 mils. The preferred thickness of the opaque layer is 0.2 to 0.8 mil. The opaque film generally has a bulk density of 0.4 to 0.5 g./ml. or less. Upon clearing by heat or pressure, the bulk density becomes substantially that of the transparent polymer itself, i.e., about one or higher.

The opaque film is employed as an adherent coating on a substantially transparent, non-fibrous base film that has strength, flexibility, dimensional stability, and inertness to temperature changes and most organic and inorganic materials. A suitable base support is of the oriented polyester type, e.g., polyethylene terephthalate. The film should be relatively thin, i.e., have a thickness of 0.5 to 7 mils, preferably within the range of 1–4 mils.

The production of printing elements by passing light through an image yielding film is further discussed in application Serial No. 63,953, filed October 21, 1960. A high contrast negative or image-bearing transparency is needed to give printing elements yielding correspondingly high quality prints. Differences in optical density of about 1 between the opaque background and the selectively cleared areas are sufficient to be used in the preparation of some printing elements by passing light through the image onto the photosensitive material. However, it is preferred that it be much higher than this and generally 3 or higher. The latter is obtained by the use of a post-densification treatment and yields negatives which are not only of greater utility but also of increased resistance to possible scratches, pressure, solvents, etc., to which they may be subjected during use or handling.

The following examples further illustrate the process of this invention.

*Example I*

A 7" x 11"-sheet of opaque film having a layer of about ½-mil thickness of a porous, opaque copolymer of vinyl chloride with methyl acrylate in about a 3/1 to 4/1 weight ratio on a polyethylene terephthalate film base of about 2-mil thickness was selectively cleared by pressing against a halftone tint plate. Any dust present was blown off with air and an aqueous solution containing 15% of a black, water-soluble dye of Colour Index No. 865, 12.5% of 95% ethanol, and 0.2% of a detergent solution containing 38% of triethanolamine salt of mixed dodecyl sulfate and octadecenyl sulfate was applied with a lint-free sponge. Excess of this solution was removed after 30 seconds by careful wiping with a windshield wiper blade. A solution containing 1% of $$Al_2(SO_4)_3 \cdot 18H_2O$$

was poured onto the surface and the film was swabbed with a lintless sponge following which it was wiped with a wiper blade and permitted to dry. The optical density of the dyed portions of this film was more than 4.5 (measured by a Welch Densichron). The wiper blades were made of soft rubber.

The film thus obtained was substantially free of streaking. The use of this image-bearing film for the preparation of a photopolymer printing plate or an intermediate contact photographic transparency gave products that were sharp and free of streaks.

*Example II*

An aqueous alcohol dye solution containing detergent was brushed on an opaque film in the manner described in Example I. After times of up to five minutes or more, penetration to the base (substrate film) was observed. Most of the excess dye was removed from the surface by a squeegee such as of soft rubber or an automobile windshield wiper. The film was then lightly but thoroughly swabbed with a tissue dripping wet with water containing 1% $Al_2(SO_4)_3 \cdot 18H_2O$. The resulting fixed dyed film was washed in running water for 15–30 seconds and the film dried. The time of drying was decreased by blotting and by blowing with warm air. The following table shows the results obtained by varying the dye (black dye of Colour Index No. 865), amount of ethanol, detergent (see Example I), water and time for penetration of the dye solution. The optical density obtained for the various samples was measured by a Westrex Electric RA1100C Densitometer. The optical density was to blue light.

| Percent Dye | Percent Ethanol | Percent Detergent | Percent $H_2O$ | Time (min.) | Optical Density |
|---|---|---|---|---|---|
| 5 | 5 | 0.1 | 89.9 | 5 plus | 2.2 |
| 5 | 5 | 0.4 | 89.6 | 1 | 2.2 |
| 10 | 5 | 0.1 | 84.9 | 5 plus | 3.9 |
| 10 | 10 | 0.1 | 79.9 | 1.5 | 4.0 |
| 10 | 15 | 0.1 | 74.9 | .5 | 3.2 |
| 10 | 5 | 0.4 | 84.6 | 1.2 | 3.6 |
| 10 | 10 | 0.4 | 79.6 | 1.0 | 3.7 |
| 10 | 15 | 0.4 | 74.6 | .3 | 3.4 |
| 15 | 10 | 0.25 | 74.75 | 1.2 | 4 plus |
| 15 | 15 | 0.25 | 69.75 | .2 | 3.9 |
| 15 | 10 | 0.5 | 74.5 | .8 | 4 plus |

*Example III*

The general procedure of Example II was repeated using two different opaque coated films, one having a coating thickness of about 0.4 mil (Film 1), the other about 0.5 mil (Film 2), each on polyethylene terephthalate of about 2 mil thickness. The dye solution was 15% of the black dye of Colour Index No. 865, 10% organic liquid, 0.5% of the detergent of Example I, and 74.5% water. The following table shows the time required for the dye solution to penetrate through the porous film and the optical density obtained for different water-soluble organic liquids:

| Organic Liquid | Penetration Time (Secs.) | | Optical Density | |
|---|---|---|---|---|
| | Film 1 | Film 2 | Film 1 | Film 2 |
| None (84.5% $H_2O$) | 95 | 120 | 3.3 | 4.0 |
| Methanol | 10 | 55 | 2.9 | 4.0 |
| Ethanol | 16 | 40 | 3.2 | 4.0 |
| Isopropyl alcohol | 5 | 25 | 3.1 | 4.0 |
| Butyl alcohol (normal) | 2 | 10 | 3.3 | 3.8 |
| Ethylene glycol | 35 | 45 | 3.4 | 4.0 |

Even higher concentrations of organic liquid can be used. Up to about 1:1 organic liquid:water there is little change in the solubility of the dye. At still higher concentrations of organic liquid the solubility of the dye falls off and less intense dyeings result. However, with other dyes that are more soluble in organic liquids this is not the case. For instance, with an afterchromed dye, Colour Index No. 15710, highly concentrated ethanol containing little water may be used as the solvent if desired.

*Example IV*

The general procedure of Example II was repeated with the stabilizing salt varied. Although solutions of 0.1% of the aluminum salt hydrate did not fix the dye fully and prevent its removal upon washing, solutions of higher concentration, e.g., 1, 2, and 10%, were effective. An aqueous solution of poly($\beta$-diethylaminoethyl methacrylate) quaternized with dimethyl sulfate was also effective as was a positive alumina-modified silica gel.

Concentrated solutions of sodium chloride were effective when the swabbing was followed by a careful wiping with a soft rubber blade rather than by rinsing in water. However, monovalent salts are not preferred as the insolubilizing salt.

The dyes that can be used to give optically dense, streak-free products preferably are water-soluble. They are optically dense, i.e., opaque to light, particularly of wave lengths used in the preparation of printing plates or intermediate photographic contact negatives from the selectively cleared, i.e., image-bearing, film. Thus for the preparation of lithographic plates, light of wave length of up to 6000 angstroms is used, whereas for photopolymer printing plates light of 3500–4200 angstroms can be used. For the preparation of images by a photographic process, light of 3500–5000 angstroms can be used. Accordingly, the dye chosen for increasing the optical density can be selected for the specific end use for the image-bearing opaque porous film.

The water-soluble dyes are preferably acid dyes. They will form aqueous solutions containing at least 5% and generally 10 to 15% of dye. It is preferred that the dye have a relatively high molecular weight, i.e., have about 20 or more carbons per molecule and a molecular weight of about 300 or more. Furthermore, the useful dyes are capable of being fixed or insolubilized with polyvalent ionic dye fixing or insolubilizing agents.

In the treating solution, the dye is present as a solution and generally comprises at least 5% and preferably 10–15% or even more of the aqueous reagent. In general, black dyes are preferred. Specific black dyes that have been used include half-chromed azo acid dyes and an afterchromed dye of Colour Index 15710.

The organic water-soluble liquid present in the dyebath is one which in low concentration in water produces a marked reduction in surface tension. The particularly useful liquids form at least a 5 weight percent solution in water. Five weight percent solution should have a surface tension of less than 65 dynes/cm. at 25° C. The preferred organic liquids produce this result at 2.5%. The approximate concentrations of various organic liquids in aqueous solutions having a surface tension of 65 dynes/cm. are listed in the following table:

| Organic liquid: | Concentration (wt. percent) |
|---|---|
| n-Propyl alcohol | <0.005 |
| n-Butyl alcohol | <0.4 |
| Methyl propionate | 0.5 |
| Isopropyl alcohol | 0.75 |
| Methyl acetate | 0.9 |
| Isobutyl alcohol | <1 |
| Ethanol | 1.3 |
| Methanol | 2.5 |

Furthermore, when present to the extent of 50% of the dyebath, the organic liquid should be one that does not substantially reduce the solubility of the particular dye to be used. In addition, the organic liquid should be substantially neutral and if it is a solvent or softening agent for the polymer of the opaque film, care must be taken to see that its concentration during all steps, including the final drying, is kept low enough so that it does not attack the film and cause partial or complete loss of pores and opacity.

Particularly useful are aliphatic oxygen-containing compounds having up to 5 carbons. Of these, the 3 and 4 carbon alkanols are particularly preferred since they give minimum times for complete penetration of the dye through the pores.

Any detergent or surface-active agent that is compatible with the aqueous organic solution containing the water-soluble acid dye can be employed. Included are the anionic and non-ionic surface-active agents. These readily available materials are employed in small amounts, e.g., from 0.01 to 1% or more. Generally about 0.05 to 0.5% of active detergent is employed. Although the use of detergent is not necessary to give dye absorption in the pores, it is advantageous because it gives more rapid and more uniform dyeing and superior final products.

Subsequent to treatment of the porous, opaque film with aqueous solution of dye, most of the excess dye solution is removed by wiping with a blade or soft tissue or cloth. If substantial amounts of the dye solution are left behind and allowed to dry on the film, the subsequent steps of removing dye from the clarified areas are nullified. The dyed and wiped pore-containing film is next treated with a "fixing" or insolubilizing agent in aqueous solution. The preferred insolubilizing agents have polyvalent ions. Aluminum in the form of solution, e.g., as a salt, is particularly useful and readily available. Other cationic materials, such as quaternary salts of poly (β-diethylamino ethyl methacrylate) are also useful.

Although the mechanism of the action of such reagents has not been established, the salt probably combines with the water-soluble dye to decrease its water solubility in the pores of the film and prevent removal of the dye by subsequent washing. The concentration used is generally low, e.g., 0.05 to 5% and usually 0.1 to 2% of active reagent. A higher concentration can be used but is generally not necessary. A test for dyes and salts that are useful in the process of this invention is that addition of aqueous salt solution, e.g., of 1% concentration, to an aqueous dye solution, e.g., of 5–15% concentration, will bring about flocculation or precipitation of the dye.

After fixing by the aqueous solution of insolubilizing agent, the image-bearing film containing dyed, porous, opaque areas and undyed selectively cleared areas is swabbed with a soft tissue, cloth, or sponge. Finally the film is washed to remove salts and dried before use as a "negative." The washing time is kept as short as possible in order to minimize solubilization and loss of dye from the porous areas. Particularly with small films washing may be omitted entirely if the fixed and swabbed film is carefully wiped with a soft blade or squeegee. The drying step is not critical except that high temperatures must be avoided in order to prevent heat clarification of the dyed opaque background areas.

The film thus obtained has highly opaque (or optically dense) portions and clear streak-free areas where it had been subjected to selective clearing prior to the application of dye. The final film combines the desired contrast with resistance to damage of the film through rubbing, scratching, or accidental application of pressure. The final films are particularly useful for the production of printing plates, e.g., as specifically shown in the printing art.

An advantage of the process of this invention is that it is simple but highly effective. It uses readily available and economical chemicals. The process does not require expensive apparatus and can be practiced by the technician of ordinary skill. Additional advantages will be apparent from the foregoing description of the invention.

I claim:

1. A process which comprises:

(a) treating with an aqueous solution the entire surface of an opaque, pressure-sensitive layer of an organic polymer said layer having clear, dense image areas and porous, opaque areas, said solution containing
  (1) a dye having a molecular weight of 300 or more, being soluble in water to the extent of and present in a concentration of at least 5% by weight and being capable of forming a precipitate with a dye-insolubilizing agent,
  (2) a compatible surface-active agent having wetting and detergent properties, and
  (3) a water-miscible organic liquid; said liquid having a surface tension less than 65 dynes per square centimeter at 25° C. in the form of a 5% by weight aqueous solution and said organic liquid being present in such a concentration that it does not attack the polymer and cause partial or complete loss of porosity;

(b) physically removing excess dye from the surface of the layer; and (c) removing additional dye from the surface of the layer by treating said surface with an aqueous solution containing about 0.05 to 5.0% concentration of a dye insolubilizing agent.

2. A process according to claim 1 wherein after step (c) said surface is washed with water.

3. A process according to claim 1 wherein said layer is on a flexible, dimensionally stable hydrophobic support.

4. A process according to claim 1 wherein the organic polymer is a vinyl addition polymer and said layer has uniformly distributed therethrough and communicating with its surface open-cell pores having an average pore diameter less than a micron.

5. A process according to claim 1 wherein said dye is a water-soluble acid dye.

6. A process according to claim 1 wherein said surface active agent is present in an amount from about 0.01% to about 1% by weight of the water.

7. A process according to claim 1 wherein said water-miscible liquid is a water-soluble alkanol of 1–4 carbon atoms.

8. A process according to claim 1 wherein said dye insolubilizing agent is a water-soluble inorganic salt.

9. A process according to claim 1 wherein said dye insolubilizing agent is a water-soluble inorganic polyvalent metal salt.

References Cited by the Examiner

UNITED STATES PATENTS

| | | | |
|---|---|---|---|
| 1,557,461 | 10/1925 | Lauten | 8—14 |
| 2,067,435 | 1/1937 | Chatfield et al. | |
| 2,524,811 | 10/1950 | Koberlein | 8—4 |
| 2,537,177 | 1/1951 | Woodruff | 8—4 |
| 2,846,727 | 8/1958 | Bechtold | 117—36.7 |
| 2,954,269 | 9/1960 | Fortess et al. | 8—14 |
| 2,961,334 | 11/1960 | Clancy et al. | 117—36.7 |
| 3,079,271 | 2/1963 | Kranz | 117—36.7 |
| 3,149,967 | 9/1964 | Bechtold | 96—27 |

FOREIGN PATENTS

| | | |
|---|---|---|
| 759,595 | 10/1956 | Great Britain. |

J. TRAVIS BROWN, *Acting Primary Examiner.*

NORMAN G. TORCHIN, *Examiner.*

A. LIBERMAN, D. PRICE, *Assistant Examiners.*